H. G. STONE.
PROPELLING WHEEL FOR TRACTORS AND OTHER VEHICLES.
APPLICATION FILED FEB. 23, 1921.
1,399,413. Patented Dec. 6, 1921.
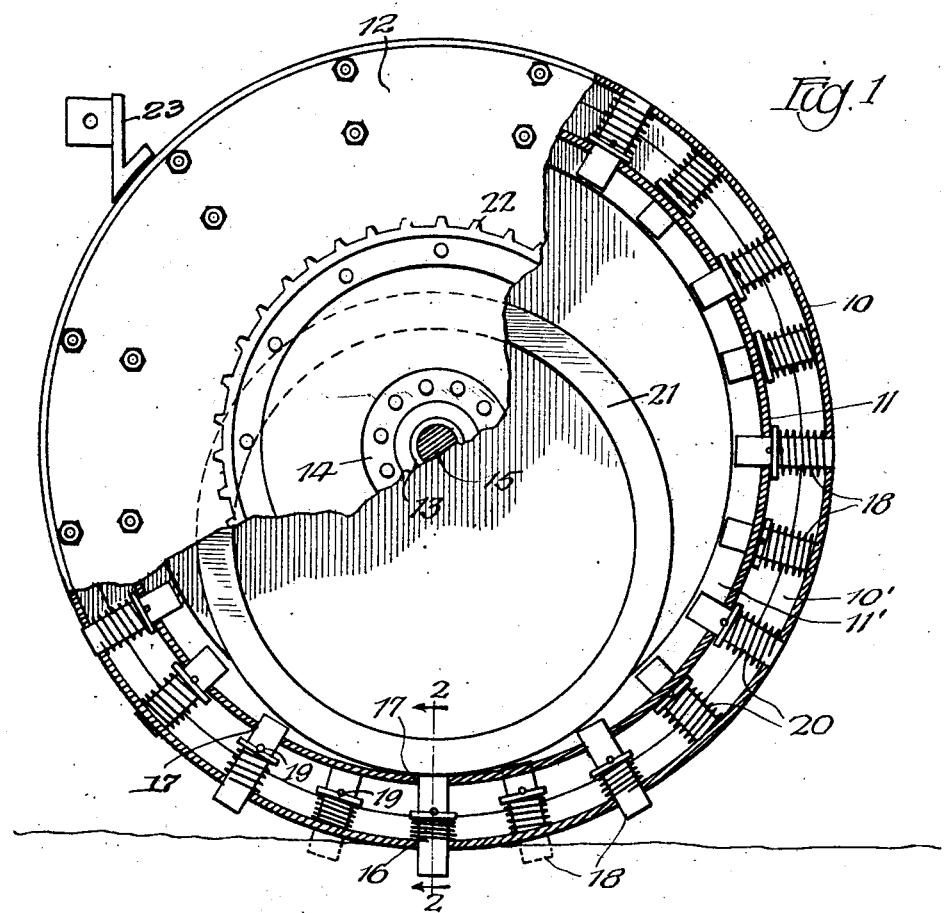
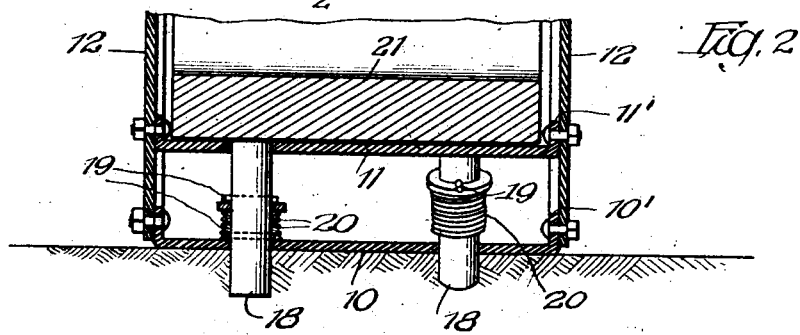
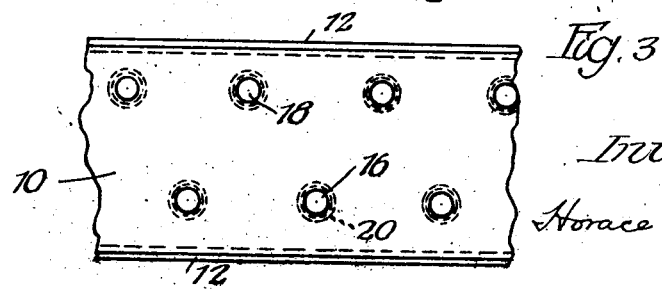
Inventor
Horace G. Stone

UNITED STATES PATENT OFFICE.

HORACE G. STONE, OF CHICAGO, ILLINOIS.

PROPELLING-WHEEL FOR TRACTORS AND OTHER VEHICLES.

1,399,413.  Specification of Letters Patent.  Patented Dec. 6, 1921.

Application filed February 23, 1921. Serial No. 447,091.

*To all whom it may concern:*

Be it known that I, HORACE G. STONE, a citizen of the United States, residing in Chicago, in the county of Cook and State of Illinois, have invented new and useful Improvements in Propelling-Wheels for Tractors and other Vehicles, of which the following is a specification.

Where the earth is soft or wet the propelling wheels of tractors and other vehicles slip more or less and mud sticks to the wheels and if chains or rigid lugs are placed on the tires of the wheels the spaces fill up with mud and the wheel slips around with little or no power of locomotion. Such wheels cannot be continuously scraped to remove the mud because of the chains or rigid lugs and in order to get sufficient power to pull loads or plows in such places the weight of the machine is materially increased causing large extra expense in building and operating which is very undesirable.

The object of my invention is to overcome these obstacles and I do it with a propelling wheel which is cleaned from mud at each revolution of the wheel and at the same time has projections from the rim of the wheel which are also cleaned at each revolution of the wheel and which projections penetrate the ground so as to give force to the wheel.

When understood my invention is simple, not expensive to build or operate and very effective.

In my invention I use sliding bolts or lugs about two inches in diameter a short distance apart sunk into the wheel throughout its entire outer circumference.
When each lug is at or near the top of the wheel it does not project from the outside circumference of the wheel; but as the wheel revolves the lug is gradually pushed out until it projects two inches when it reaches the earth and it stays out said two inches until it has passed through the earth below the wheel thus preventing the wheel from slipping.

Then as the wheel revolves the lug rises at the rear of the wheel and the lug is withdrawn into the socket which cleans the lug from mud, &c.

Where the lugs are thus drawn into their respective sockets the outside surface of the wheel is smooth and if any mud remains upon it a mud scraper removes it as the lugs being withdrawn into their sockets are not an obstacle preventing the scraper from being effective.

The lugs are withdrawn into their sockets by a spring and by their own weight.

The lugs are pushed out two inches at the bottom of the wheel by a heavy ring inside the wheel. This ring is loose and revolves with the wheel and as lugs approach the bottom of the wheel the ring rolls onto the upper end of the lugs and the weight of the lugs plus the weight of the heavy ring pushes the lugs down into the earth.

The heavy ring is less in circumference than the wheel and as the wheel revolves upward the ring rolls off the ends of the lugs, thus liberating the lugs and then the springs pull the lugs back into their sockets and so on continuously. The size and weight of the ring may be regulated to suit different regions and conditions or there may be two rings different in size and weight so that one or the other may be used as desired.

However much mud there may be the wheel and the lugs are always clean when they reach the ground and the lugs are prepared to do as good work to prevent slipping as they did to begin with and there is no mud on the wheel to interfere with its work or with the work of the lugs or to clog up the spaces on the wheel between the lugs.

It will be noted that when the ground is dry so that the use of the projections at the bottom of the wheel is unnecessary the ring may be removed from the wheel; the lugs will then all be drawn in by the springs leaving the tire of the wheel smooth and suitable for a hard road.

Other advantages, objects and purposes of my invention will be apparent as it is better understood from the following description when considered in connection with the accompanying drawing illustrating a preferred embodiment thereof.

Referring to the drawings,—

Figure 1 is a side elevation of a tractor wheel partly broken away embodying my invention.

Fig. 2 is a cross section on line 2—2 of Fig. 1.

Fig. 3 is a partial plan view of the outside rim of the wheel showing spacing of tractor lugs.

10 is the outside band or rim of the wheel.

10¹ is where the plates 12 are attached to the outer edges of the outside band or rim of the wheel with screws or bolts.

11 is the inside band of the wheel which holds the inside ends of the lugs as they work back and forth.

11¹ is where the plates 12 are attached to the outer edges of the inside band 11 with screws or bolts.

12 are the plates—one on each of the outer sides of the wheel—which plates connect or hold together the bands 11 and 12 with the hub 13 of the wheel. One of these plates is removable. These plates inclose the space between the bands 10 and 11 and inclose separately the space between the band 11 and the hub. Screws or bolts connect these plates with rim 10, band 11 and hub 13.

13 is the hub of the wheel.

14 are the outside edges of the hub to which the plates 12 are attached with bolts or screws.

15 is the axle on which the wheel revolves.

16 are the lug holes in the outer band 10 of the wheel.

17 are the lug holes in the inner band 11 of the wheel.

18 are the lugs held by 10 and 11 in lug holes 16 and 17 so as to have said lugs move lengthwise back and forth.

19 are pins in holes in the lugs to prevent the outer end of the lug from receding into the wheel more than flush with the outside of the wheel and to regulate the distance of the projection of the lugs outward from the wheel.

20 are the springs around the lugs 18 and held by the pins 19 which springs withdraw the lugs when the ring 21 ceases to act upon the lugs.

21 is the ring which aided by gravity pushes the lugs 18 down and out from the circumference of the wheel into the earth at the lower part of the wheel to prevent the wheel from slipping.

22 is means for connecting the wheel with its propelling power.

23 is the mud scraper at the circumference of the wheel at a point where the lugs do not project from the wheel which scraper cleans the outside rim of the wheel at each revolution of the wheel without being obstructed by the withdrawn lugs.

It will be manifest that various changes may be made in the form, construction and arrangement of the parts and that well known mechanical equivalents may be used in place of one or more of the described devices for performing the same office and producing the same result without departing from the spirit and scope of the invention or sacrificing any of its material advantages; the form and devices hereinbefore described being merely a preferred embodiment thereof.

I claim:

1. A traction wheel, comprising a rim, a hub, plugs extending through said rim and slidable therethrough to and from extended and retracted positions, springs for retracting said plugs, and a gravity member engaging the inner ends of said plugs when they approach the ground for projecting them from said rim into traction engagement with the ground, and means for connecting the rim with the hub.

2. A traction wheel, comprising a rim, a hub, plugs extending through said rim and slidable therethrough to and from extended and retracted positions, springs for retracting said plugs, a member freely rolling on the inner ends of said plugs at the lower travel of the wheel for extending said plugs into traction engagement with the ground, and means for connecting the rim with the hub.

3. A traction wheel, comprising a rim, a hub, traction plugs slidably mounted through the rim, springs for retracting said plugs to bring their outer ends substantially flush with the surface of the rim, a rolling gravity member mounted within the rim and riding on the plugs at the bottom of the wheel for projecting them into traction ground engaging position, and means for connecting the rim with the hub.

4. A traction wheel, comprising a rim, a hub, an inner band, traction plugs extending through said band and rim, means for connecting the rim, inner band and hub, springs for retracting said plugs to bring the outer ends substantially flush with the surface of the wheel, and a rolling gravity member for engaging the inner ends of said plugs to project them into traction ground engaging position.

5. A traction wheel, comprising a rim, a hub, an inner band, traction plugs extending through said band and rim, means for connecting the rim, inner band and hub, springs for retracting said plugs to bring the outer ends substantially flush with the surface of the wheel, and a rolling gravity member for engaging the inner ends of said plugs to project them into traction ground engaging position with the inner ends substantially in the plane of the inner face of said inner ring.

In testimony whereof, I affix my signature in presence of two witnesses.

HORACE G. STONE.

Witnesses:
H. E. McNEIL,
M. H. STIMSON.